US012770289B1

(12) United States Patent
Barrett

(10) Patent No.: US 12,770,289 B1
(45) Date of Patent: Oct. 20, 2026

(54) DETECTION AND TRACKING OF LOW SIGNAL-TO-NOISE RATIO MOVING TARGETS IN REMOTE SENSING IMAGERY

(71) Applicant: National Technology & Engineering Solutions of Sandia, LLC, Albuquerque, NM (US)

(72) Inventor: Daniel Paul Barrett, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 653 days.

(21) Appl. No.: 18/103,661

(22) Filed: Jan. 31, 2023

(51) Int. Cl.
*G06T 7/73* (2017.01)
*G06T 7/254* (2017.01)

(52) U.S. Cl.
CPC ................ *G06T 7/74* (2017.01); *G06T 7/254* (2017.01); *G06T 2207/20224* (2013.01)

(58) Field of Classification Search
CPC ....................... G06T 7/74; G06T 7/254; G06T 2207/20224
See application file for complete search history.

(56) References Cited

U.S. PATENT DOCUMENTS 10,032,285 B1 * 7/2018 Ma .......................... G06T 7/277
10,445,862 B1 * 10/2019 Merry ....................... G06T 7/35
11,801,865 B2 * 10/2023 Stenson .................. G01S 17/42
2005/0147443 A1 * 7/2005 Jensen ..................... B41J 11/42 400/76
2014/0085462 A1 * 3/2014 Karlov .................... G06T 7/277 348/143
2019/0187297 A1 * 6/2019 Li ........................... G01S 19/49
2023/0266468 A1 * 8/2023 Jang ...................... G01S 7/4808 356/4.01
2023/0408261 A1 * 12/2023 Matsudaira ............. G06T 7/246
2024/0212222 A1 * 6/2024 Peuhkurinen ............. G06T 3/40

FOREIGN PATENT DOCUMENTS

CN 109919981 A * 6/2019

OTHER PUBLICATIONS

Jonschkowski et al. "Pves: Position-velocity encoders for unsupervised learning of structured state representations." (2017) arXiv preprint arXiv:1705.09805. pp. 1-7. (Year: 2017).*
(Continued)

*Primary Examiner* — Emily C Terrell
*Assistant Examiner* — Dominique James
(74) *Attorney, Agent, or Firm* — Calfee, Halter & Griswold LLP; Samantha Updegraff; Merle W. Richman

(57) ABSTRACT

A method for detecting and tracking objects in low signal-to-noise ratio (SNR) remote sensing imagery includes receiving a sequence of images depicting a scene over time. A set of velocity-state images representative of possible positions and velocities of objects is computed for each time at which an image was received. When a current image is received after a prior image, the current set of velocity-state images is computed based on the current image and the set of velocity-state images corresponding to the prior time. The likely presence of a moving object in the scene is determined based upon pixel values of the velocity-state images.

16 Claims, 7 Drawing Sheets

(56) References Cited

OTHER PUBLICATIONS

Arnold, J. et al., "Efficient Target Tracking Using Dynamic Programming", In IEEE Transactions on Aerospace and Electronic Systems, vol. 29, No. 1, Jan. 1993, pp. 44-56.
Barbu, A. et al., "Simultaneous Object Detection, Tracking, and Event Recognition", arXiv preprint arXiv:1204.2741, Apr. 12, 2012, pp. 1-11.
Barniv, Y., "Dynamic Programming Solution for Detecting Dim Moving Targets", In IEEE Transactions on Aerospace and Electronic Systems, vol. AES-21, No. 1, Jan. 1985, pp. 144-156.
Forney, Jr., G. D., "The Viterbi Algorithm", In Proceedings of the IEEE, vol. 61, No. 3, Mar. 1973, pp. 268-278.
Reed, I. S. et al., "Application of Three-Dimensional Filtering to Moving Target Detection", In IEEE Transactions on Aerospace and Electronic Systems, vol. AES-19, No. 6, Nov. 1983, pp. 898-905.
Simonson, K. M. et al., "Robust Real-Time Change Detection in High Jitter", Sandia Report SAND2009-5546, Aug. 2009, 41 pages.
Succary, R. et al., "Dynamic Programming Algorithm for Point Target Detection: Practical Parameters for DPA", In Proceedings of SPIE, vol. 4473, 2001, Nov. 26, 2001, pp. 96-100.
Viterbi, A. J., "Error Bounds for Convolutional Codes and an Asymptotically Optimum Decoding Algorithm", In IEEE Transactions of Information Theory, vol. IT-13, No. 2, Apr. 1967, pp. 260-269.

* cited by examiner

DETECTION AND TRACKING OF LOW SIGNAL-TO-NOISE RATIO MOVING TARGETS IN REMOTE SENSING IMAGERY

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Remote sensing imagery generated by imaging sensors mounted on aircraft and spacecraft are now being employed for various regional surveillance and monitoring applications. Various object detection algorithms have been employed to detect targets in a scene depicted in remote sensing images. However, some targets of interest exhibit a low signal-to-noise ratio (SNR) in these images, making these targets difficult to detect.

Among techniques developed to enable automatic detection of low SNR targets in remote sensing imagery are signal integration techniques that sum, or integrate, a sequence of images of a scene. By such integration, randomly-distributed noise in the images partially cancels, whereas energy associated with true targets accumulates, thereby causing pixels representative of true targets to be distinguishable from noise.

Naïve signal integration techniques in remote sensing imagery are straightforward for stationary targets but are poorly suited to detecting low-SNR moving targets in a scene depicted in a sequence of remote sensing images. For moving targets, if a sequence of images of a scene is overlaid over one another, and summed, noise will still partially cancel, but the energy associated with the low-SNR moving target will be spread across multiple mis-aligned pixels in the sequence of images.

Signal integration techniques for detecting moving low-SNR targets in remote sensing images have been developed that employ candidate target motion paths to guide signal integration across multiple frames. Some of these techniques require computationally intensive searches over large sets of candidate motion paths through a scene, which renders some of these algorithms unsuitable for execution in real-time over streaming image data. Other of these techniques place strict constraints on candidate motion paths that can reduce the computation-intensity of integrating over a set of candidate motion paths, but that can also exclude various real, valid motion paths from consideration. Still others of these techniques reduce the computation-intensity of a search over candidate motion paths in a way that forces many physically impossible paths to be considered, which tends to reduce the SNR of the signal-integrated output. In various applications, moving low-SNR targets remain difficult to detect using these existing algorithms.

SUMMARY

The following is a brief summary of subject matter that is described in greater detail herein. This summary is not intended to be limiting as to the scope of the claims.

Various technologies relating to detection of moving low-SNR targets in remote sensing images are described herein. In exemplary embodiments, a computing system receives a sequence of images of a scene, wherein each of the images is representative of the scene over a period of time. The sequence of images can be received as a batch of images over which moving-target-detection is desirably performed. In other embodiments, the sequence of images can be received as streaming video data that comprises a plurality of image frames depicting the scene, wherein each of the image frames is received at a different time.

The computing system employs a discrete state machine signal integration algorithm to identify low-SNR moving targets in the sequence of images. The algorithm employs a state machine representation of a space of possible object positions (e.g., pixel locations in the images, or sub-pixel locations in the images), velocities, and accelerations. The state machine represents the space of possible object positions with a two-dimensional (2D) position grid. The 2D position grid can have a one-to-one correspondence between grid positions and pixel locations in the sequence of images. In other embodiments, the 2D position grid can have a sub-pixel grid spacing, such that there are multiple grid positions lying within a single pixel location in the sequence of images.

The state machine represents the space of possible velocities and accelerations by a 2D velocity grid. Horizontal position on the 2D velocity grid is indicative of a horizontal velocity of a candidate target, whereas vertical position on the 2D velocity grid is indicative of a vertical velocity of a candidate target. Acceleration can be modeled by a constraint imposed on transitions between positions in the 2D velocity grid from one time period to the next (i.e., from one image to a subsequent image in the sequence of images).

The sequence of images can include a first image and a second image that represent a same scene at first and second times, respectively. The computing system generates a plurality of velocity-state images based upon the second image in the sequence of images. Each of the velocity-state images is associated with a velocity state. For ease of explanation, states pertaining to the second image in the sequence of images are referred to here as "current" states, and states associated with the first image from the sequence of images are referred to here as "prior" states. A value of a pixel at a given location in a velocity-state image can be computed as a score that is based upon 1) a pixel value of the second image at that same location and 2) a score of a pixel in an image from the prior state, the pixel of the prior state image being positioned at a pixel location from which a candidate target could have reached the given location in the current state given its current velocity state. The image from the prior state can be a velocity-state image derived from the first image, or in some embodiments (e.g., when no images prior to the first image are available) can be the first image itself. In some embodiments, the prior-state score can be initialized to zero if the first image is the earliest-available image of the scene. The scores for the pixels of the velocity-state images are computed such that higher scores are associated with pixels consistent with estimated object motion from prior states.

The computing system can generate an SNR-enhanced image of the scene based upon the velocity-state images. The SNR-enhanced image is representative of the scene at the current state represented by the velocity-state images. The SNR-enhanced image depicts moving objects in the scene with enhanced SNR relative to the sequence of images originally received. For instance, in the SNR-enhanced images, low-SNR moving objects depicted in the original images are made brighter than they appear in the original sequence of images. Further, the computing system can generate the SNR-enhanced image such that the SNR-enhanced image includes metadata indicative of an estimated velocity and/or acceleration associated with each pixel of the SNR-enhanced image.

In exemplary embodiments, the computing system generates the SNR-enhanced image by selecting, for each pixel location in the velocity-state images, a maximum-value pixel of the velocity-state images, and assigning its value to a pixel of the SNR-enhanced image at that same pixel location. For example, an upper-left-most pixel of the SNR-enhanced image can have a pixel value that is the same as the maximum value of the upper-left-most pixels of the various velocity-state images.

In various embodiments, the computing system can be configured to compute a set of velocity-state images for each subsequent image in the sequence of images, and to generate an SNR-enhanced image from the velocity-state images, such that an SNR-enhanced image is generated for each remote sensing image received. The computing system can further be configured to identify, based on the SNR-enhanced images, a track of an object depicted in the SNR-enhanced images over a period of time represented by the SNR-enhanced images. The computing system can further be configured to output, to a display, an indication of the track of the object through the scene (e.g., as an overlay on one or more of various images of the scene). In further embodiments, the computing system can output position, velocity, and/or acceleration data associated with the track for use or further processing by other systems (e.g., to an airborne surveillance system for the purpose of sensor steering).

The above simplified summary is meant to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
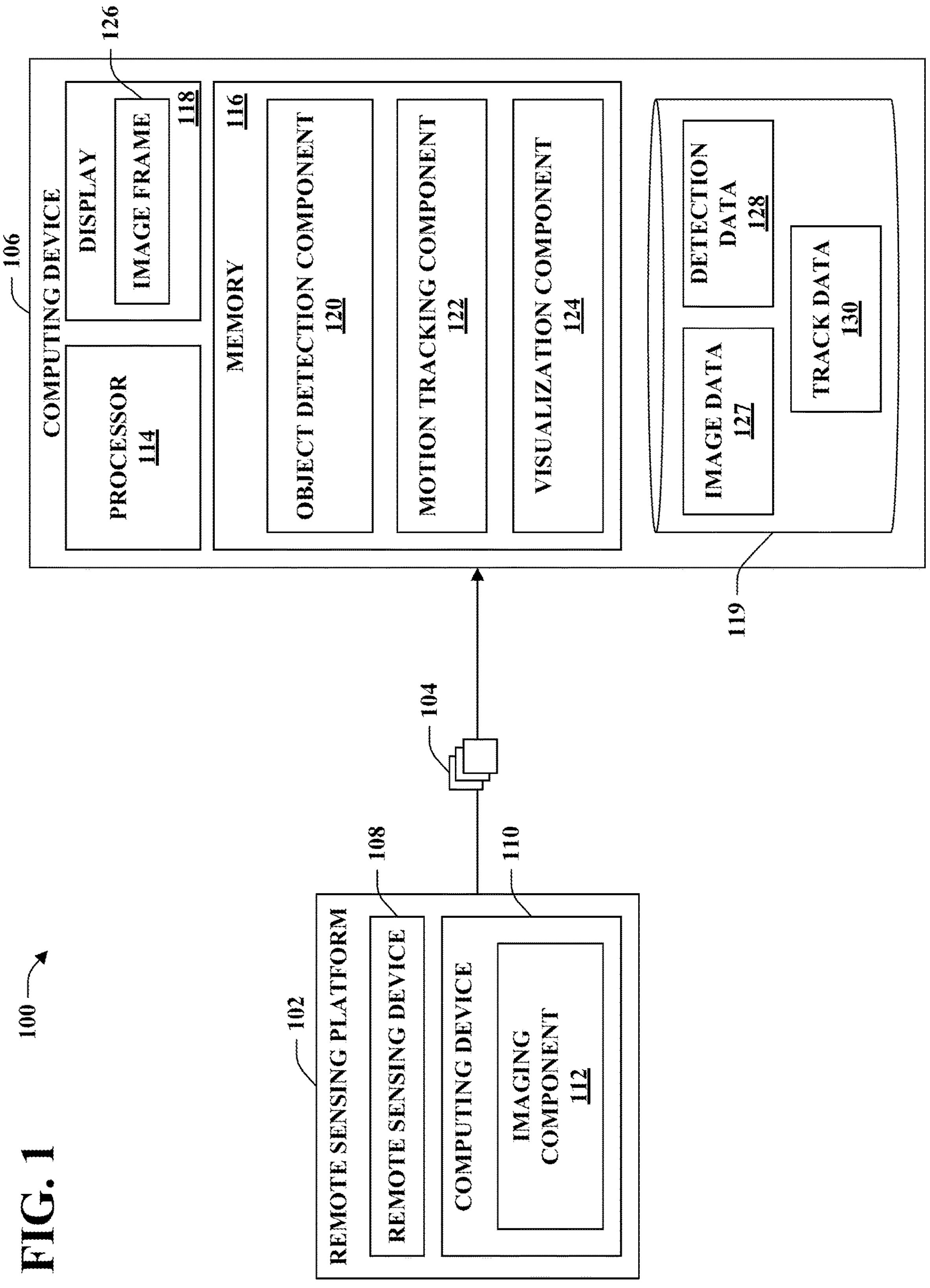
FIG. 1 is a functional block diagram of an exemplary system that facilitates detection and tracking of low-SNR moving objects in remote sensing imagery.

Various technologies pertaining to detection and tracking of objects exhibiting low-SNR in remote sensing images are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary system 100 that facilitates detection and tracking of objects in remote sensing images is illustrated. The system 100 includes a remote sensing platform 102 that generates images 104 of a scene (e.g., a portion of a surface of the Earth or other celestial body), and a computing device 106 that receives the images 104. The remote sensing platform 102 can be, for example, an aircraft that flies over the scene or a spacecraft having the scene in its field of view. In various exemplary embodiments, the computing device 106 can receive the images 104 directly from the remote sensing platform 102. In other embodiments, the computing device 106 can receive the images 104 from the remote sensing platform 102 indirectly, such as by way of an intermediary device (not illustrated) that first receives the images 104, or over a network of devices that, taken together, form a communications link between the remote sensing platform 102 and the computing device 106. The computing device 106 is configured to identify, in the images 104, moving objects that exhibit low SNR. In other words, the computing device 106 is configured to identify moving objects in the scene depicted by the images 104, where such objects may be difficult to automatically identify due to the presence of noise in the images 104.

The remote sensing platform 102 comprises a remote sensing device 108 and can further optionally include a computing device 110. The remote sensing device 108 is configured to generate remote sensing data that is representative of a scene in a field-of-view of the remote sensing device 108. In various exemplary embodiments, the remote sensing device 108 can be or include a camera, a radar sensor, a lidar sensor, or the like. The computing device 110 includes an imaging component 112 that is configured to receive remote sensing data from the remote sensing device 108 and to generate the images 104 therefrom. In exemplary embodiments, the remote sensing device 108 can be or include a camera, a radar sensor, a lidar sensor, a sonar sensor, or the like. In some embodiments, the remote sensing device 108 can generate the images 104 directly. In other embodiments, the remote sensing device 108 outputs the remote sensing data to the computing device 110. In these embodiments, the imaging component 112 generates the images 104 based upon the remote sensing data. By way of example, and not limitation, in embodiments wherein the remote sensing device 108 is a synthetic aperture radar (SAR) sensor, the imaging component 112 can receive radar returns from the remote sensing device 108 and generate SAR images based upon the radar returns, which SAR images are output as the images 104.

The images 104 depict a same scene at different respective times over a period of time. Thus, the images 104 collectively depict objects in the scene over the period of time, as well as motion of such objects. In various embodiments the images 104 can form a video wherein the images 104 are frames of the video. In these embodiments, a time between the images 104 can be relatively short (e.g., less than 1 second, less than 0.1 seconds, less than 0.05 seconds, or less than 0.02 seconds). In other embodiments, a time between the images 104 can be longer (e.g., greater than 1 second, greater than 10 seconds, or greater than 1 minute). In the exemplary embodiment shown in FIG. 1, the computing device 106 receives the images 104, and identifies a moving object depicted in the images 104 and its trajectory across the set of images 104. However, it is to be understood that in some embodiments, functionality relating to identifying moving objects and trajectories of those objects in the images 104 can instead be performed by the computing device 110 included on the remote sensing platform 102.

The computing device 106 comprises a processor 114, memory 116 that stores instructions that are executed by the processor 114, a display 118, and a data store 119. The memory 116 includes an object detection component 120, a motion tracking component 122, and a visualization component 124, each of which can be executed by the processor 114. Briefly, the object detection component 120 is configured to determine the locations of objects that are characterized by low SNR (referred to herein as "low-SNR objects") in the images 104; the motion tracking component 122 is configured to identify tracks through the scene of objects detected by the object detection component 120 in the images 104; and the visualization component 124 is configured to output, to the display 118, a graphical indication of a detected object and/or its track through the scene depicted in the images 104.

Various exemplary operations of the computing device 106 are now described in greater detail. The computing device 106 receives the images 104 from the remote sensing platform 102. The object detection component 120 processes the images 104 to identify a candidate moving object in the images 104. The object detection component 120 employs signal integration methods using the plurality of images 104 of a scene to sum the energy of true targets across the images 104 while partially cancelling randomly-distributed noise. As noted above, to improve the detectability of moving targets by signal integration, the images 104 cannot simply be added on a pixel-wise basis. Rather, the object recognition component 120 employs a state-machine model of possible positions, velocities, and accelerations of candidate objects in the scene depicted by the images 104 to guide a signal integration process. Thus, the object recognition component 120 can determine that a moving object is likely present at a location in the scene at a first time based upon the state-machine model, an image in the images 104 that depicts the scene at the first time, and at least one image in the images 104 that depicts the scene at a time prior to the first time.

Figure 2:
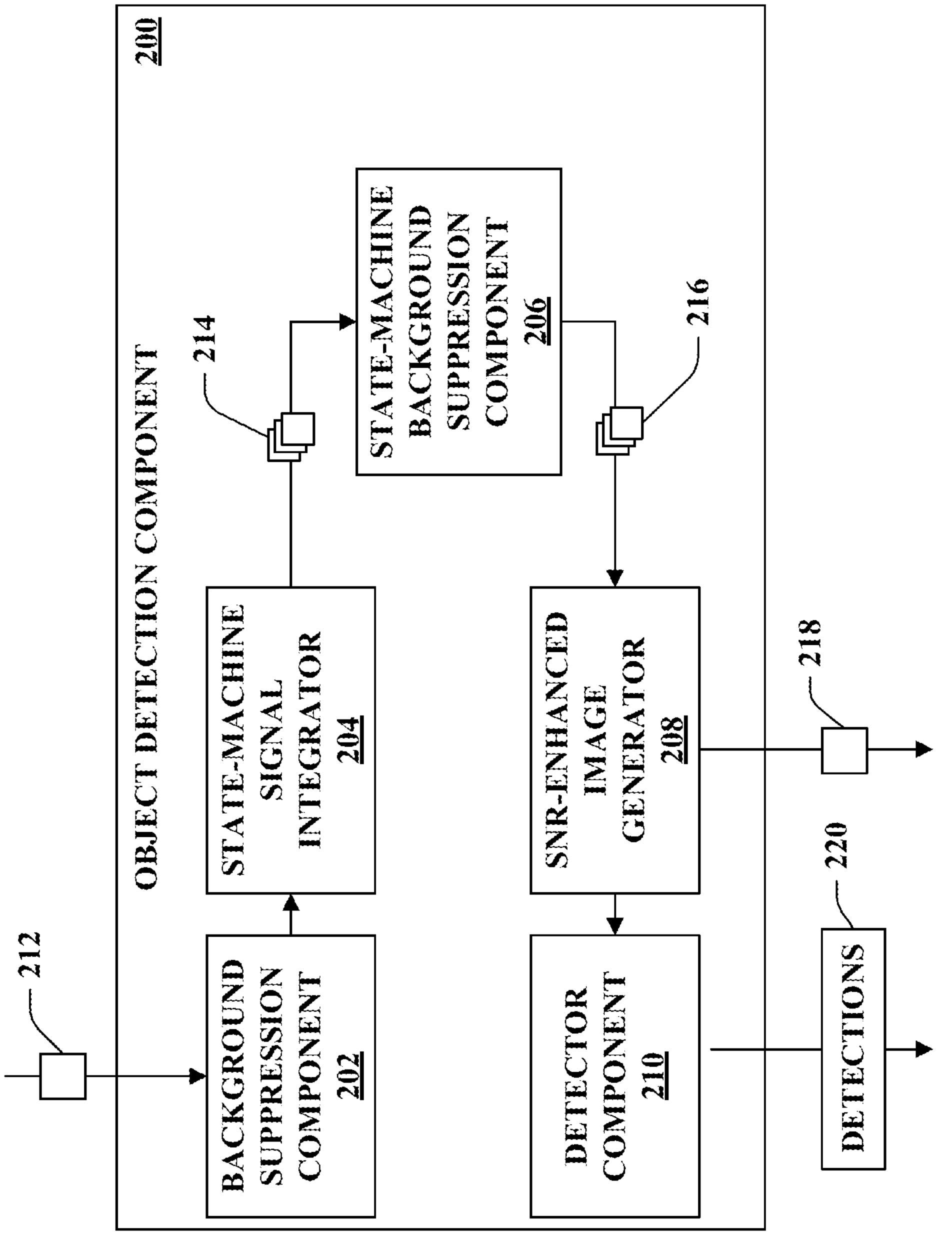
FIG. 2 is a functional block diagram of an exemplary object detection component.

With reference now to FIG. 2, an exemplary object detection component 200 is illustrated in greater detail. In exemplary embodiments, the object detection component 120 can be or include the object detection component 200. The object detection component 200 receives, over time, a sequence of images that each depict a same scene at a different respective time. For each of the images, the object detection component 200 can generate either or both of an SNR-enhanced version of the image or a list of detections that comprises locations at which low-SNR moving objects are likely to be present in the scene at the time depicted in the image. The SNR-enhanced image and the list of detections can further include, for each of the pixels indicated as being likely representative of a low-SNR moving object, an estimated velocity of the object. The object detection component 200 comprises a background suppression component 202, a state-machine signal integrator 204, a state-machine background suppression component 206, an SNR-enhanced image generator 208, and a detector component 210. Briefly, the background suppression component 202 receives an image 212 of a scene (e.g., one of the images 104) and generates a difference image; the state-machine signal integrator receives the difference image and generates a plurality of velocity-state images 214; the state-machine background suppression component 206 receives the velocity-state images 214 and generates a corresponding plurality of velocity-state difference images 216; the SNR-enhanced image generator 208 receives the velocity-state difference images 216 and generates an SNR-enhanced image 218 that may be output by the object detection component; in various embodiments, the detector component 210 receives the SNR-enhanced image 218 and outputs a set of detections 220 that comprises indications of locations of likely moving low-SNR targets in the scene depicted in the original image 104.

Details of exemplary operations of components of the object detection component 200 are now described. The background suppression component 202 receives the image 212. As indicated above, the image 212 can be one of a sequence of images of a scene taken at different times. For instance, the image 212 can be one of the images 104 generated by the remote sensing platform 102. Responsive to receipt of the image 212, the background suppression component 202 generates a difference image of the scene based upon the image 212. The difference image is an image of the scene in which background clutter (i.e., real objects in the scene, such as ground cover, or vegetation, that are not of interest to an analyst) is suppressed, thereby rendering pixels that are likely representative of objects of interest (e.g., vehicles, pedestrians, or other moving objects) brighter than the underlying background clutter present in the original image 212. The background suppression component 202 can generate the difference image by applying an infinite impulse response (IIR) filter over the image 212. In other embodiments, the background suppression component 202 can employ other techniques for performing background suppression in the image 212. By way of example, and not limitation, the background suppression component 202 can generate the difference image based upon an automatic real-time clutter suppression method described in K. M. Simonson and T. J. Ma, "Robust Real-time Change Detection in High Jitter," Sandia National Laboratories, Albuquerque, 2009 SAND 2009-5546. In still another example, the background suppression component 202 can generate the difference image by providing the image 212 to a neural network trained to receive remote sensing imagery and to output difference images in which pixels that are likely to represent objects of interest have higher values than pixels that are likely representative of background clutter. In various embodiments, the difference image can be a normalized difference image wherein pixel values of the normalized difference image have a zero-value mean and in which the standard deviation of noise in the normalized difference image is normalized to 1. In some applications, a stationary or moving target may have sufficiently high SNR in the original image 212 that the high-SNR target appears as a bright pixel than can be readily detected in the difference image. However, some desirably-detected targets in the original image 212 exhibit sufficiently low SNR that they cannot be directly distinguished from noise pixels in the difference image.

The state-machine signal integrator 204 is configured to facilitate detection of low-SNR targets in the image 212 based upon a state-machine model of potential positions, velocities, and accelerations of objects in a scene depicted in the image 212. The state-machine signal integrator 204 receives the difference image from the background suppression component 202, and based thereon generates the plurality of velocity-state images 214. The velocity-state images 214 are representative of the state-machine model of potential positions, velocities, and accelerations of objects in the scene depicted in the image 212. Each of the velocity-state images 214 can have a same number of pixels as the original image 212, and there may be a one-to-one correspondence between pixel positions in the velocity-state images 214 and the image 212. Stated differently, an upper-left-most pixel in each of the velocity-state images 214 can be representative of a same portion of the scene as an upper-left-most pixel of the image 212. Accordingly, pixel locations in the velocity-state images 214 are representative of positional states of objects in the scene. In exemplary embodiments, each of the velocity-state images 214 corresponds to a particular velocity state of the state-machine model. As is described in greater detail below, acceleration is modeled by transitions, from one time to another (e.g., from one image in a sequence of images of a scene to a subsequent image in the sequence of images), between velocity states. The velocity-state images 214 therefore make up a position-velocity grid that is representative of all potential position-velocity states of objects depicted in the image 212 at the time at which the image 212 was taken.

Figure 3:
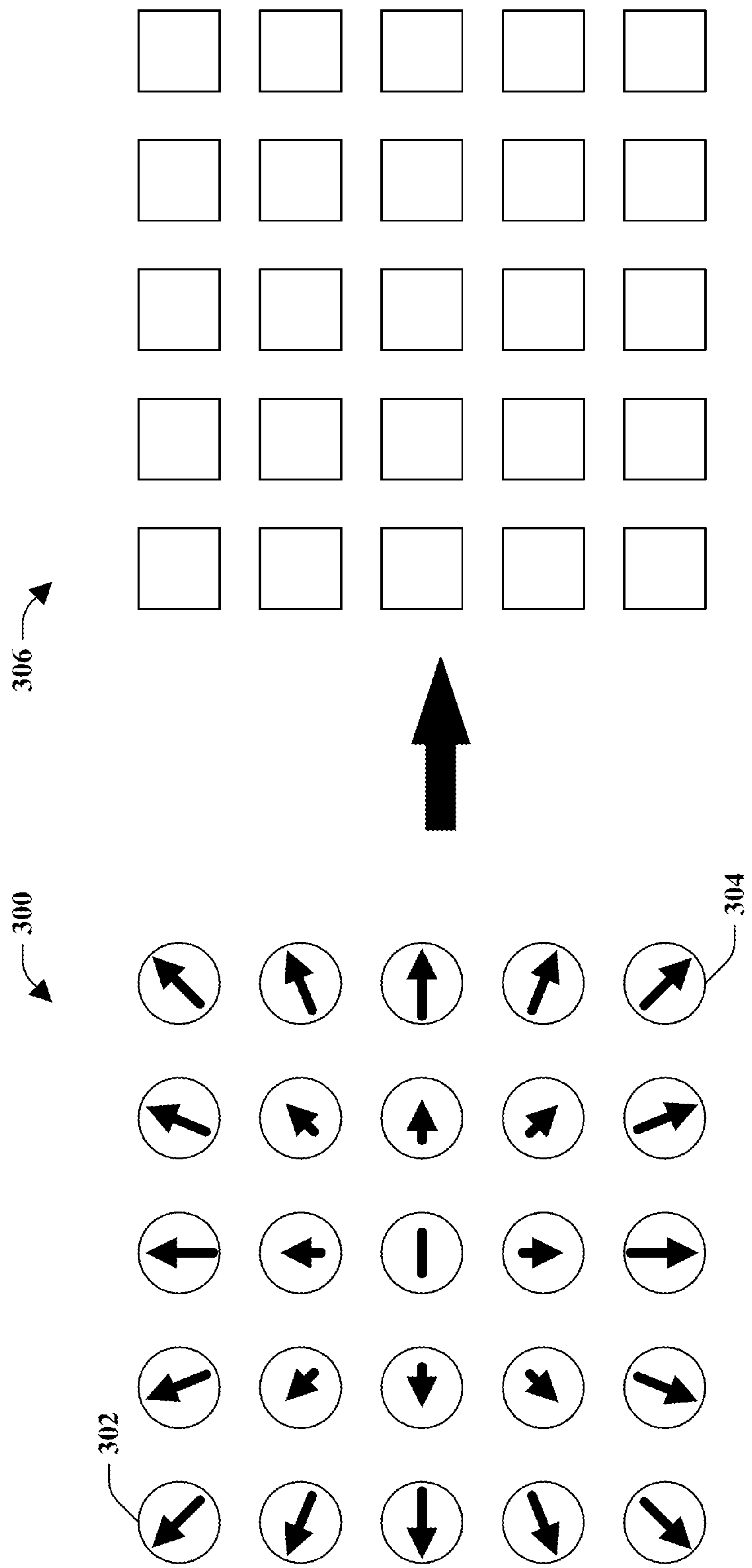
FIG. 3 is a conceptual diagram of a velocity-state grid and a corresponding set of velocity-state images.

Referring now to FIG. 3, an exemplary grid 300 of velocity states is shown. The exemplary grid 300 includes a plurality of 25 velocity states arranged in rows and columns according to horizontal and vertical velocity components (relative to a reference frame of an image to which the velocity states pertain), respectively. Thus, for example, an upper-left-most velocity state 302 has a greatest upward velocity and greatest leftward velocity among the velocity states of the grid 300, whereas a lower-right-most velocity state 304 has a greatest downward velocity and greatest rightward velocity among the velocity states of the grid 300. Also, depicted in FIG. 3 is a set of velocity-state images 306 corresponding to the velocity-state grid 300. The set of velocity-state images 306 includes one velocity-state image for each of the velocity states in the grid of velocity states 300. In other words, there is a one-to-one correspondence between the velocity states 300 and the velocity-state images 306. In various embodiments, the velocity states of the grid 300 can have a uniform grid spacing. Stated differently, a transition from one grid position to an adjacent grid position can represent a fixed difference in velocity between the two grid positions. In other embodiments, the velocity states of the grid 300 can have non-uniform, but still known grid spacing. Thus, a velocity state in the grid 300 can be defined by a pair of column and row coordinates. Similarly, the velocity-state images 306 can be arranged in the same manner as the grid 300 such that a velocity state corresponding to each of the velocity state images can be defined by column and row coordinates.

Referring once again to FIG. 2, the state-machine signal integrator 204 can generate a set of velocity-state images for each of a sequence of images of the scene depicted in image 212 (including the image 212). Thus, for a sequence of images of a same scene, the state-machine signal integrator 204 generates multiple sets of velocity-state images, one set for each image of the scene. Each of these sets of velocity-state images is representative of the state-machine model of positions, velocities, and accelerations of objects in the scene at a different respective time. This sequence of position-velocity grids (i.e., the sets of velocity-state images) implicitly forms a lattice of position-velocity-time nodes. Given such a lattice, an associated score for each node in the lattice, and an associated score for each transition in the lattice, the state-machine signal integrator 204 can use a Viterbi or Viterbi-like algorithm that employs a scoring function that satisfies the Markov assumption to find a highest-scoring path through the lattice to a given point. Stated differently, the state-machine signal integrator 204 can be configured to determine, for each position-velocity-time point in the lattice (e.g., defined by a pixel location in a velocity state image corresponding to a particular time), a highest-scoring path from the beginning of the lattice to that position-velocity-time point subject to the chosen scoring function.

In exemplary embodiments, the state-machine signal integrator 204 can define a pixel value of a velocity-state image as:

$$S_{t,i,j}(c, r) = \max_{\substack{\Delta i \in \{-1,0,1\} \\ \Delta j \in \{-1,0,1\}}} \left(N_t(c, r) + S_{t-1,i+\Delta i,j+\Delta j}(c - v_i, r - v_j) + T_{\Delta i \Delta j}\right) \quad \text{Eq. 1}$$

where $S_{t,i,j}$ is a velocity-state image at time t (e.g., a time at which the input image 212 was captured) with ith column velocity and jth row velocity in a grid of potential velocity states (e.g., the grid 300); $S_{t,i,j}(c,r)$ is a value of a pixel of the velocity-state image at column c and row r; $\Delta i$ and $\Delta j$ are column and row velocity state changes, respectively; $N_t(c,r)$ is a node score of pixel position (c, r) at time t, which in the embodiment of the object detection component 200 shown in FIG. 2 is the pixel value at location (c, r) of the difference image output by the background suppression component 202; $v_i$ and $v_j$ are the column and row velocities associated with velocity state (i,j) (i.e., the velocity state of the velocity-state image $S_{t,i,j}$); and $T_{\Delta i \Delta j}$ is a transition score associated with the velocity state transitions $\Delta i$, $\Delta j$.

In exemplary embodiments, the node score $N_t(c,r)$ employed by the state-machine signal integrator 204 in connection with computing a pixel value of a velocity-state image is a pixel value of the input image 212 to which the velocity-state image pertains.

The constraints $\Delta i \in \{-1,0,1\}$ and $\Delta j \in \{-1,0,1\}$ indicated in Eq. 1 enforce allowable velocity state transitions, thus representing implicit constraints on acceleration. While these exemplary constraints allow transitions only to adjacent grid positions in a velocity-state grid, it is to be understood that constraints on Δi and Δj can be configured to define substantially any desired constraint on object acceleration in horizontal and vertical directions. By way of example, and not limitation, the constraints associated with Δi, Δj can permit transitions up to two grid positions away in each direction, up to five grid positions away in each direction, up to ten positions away in each direction, etc.

The term $S_{t-1,i+\Delta i,j+\Delta j}(c-v_i, r-v_j)$ in Eq. 1 identifies a position in a prior step's velocity-image from which a step taken at the current state's velocity (i.e., $v_i$, $v_j$) will lead to the currently-evaluated position (c, r). Thus, considered trajectories are constrained to fit a motion model defined by a current velocity state and constrained by allowable transitions between velocity states from one time step to the next (e.g., from one input frame to the next). In other embodiments, considered trajectories can be constrained to fit a motion model defined by a prior velocity state, or an interpolated velocity state between a prior velocity state and the current velocity state. As written in Eq. 1, $v_i$ and $v_j$ are defined in terms of a number of pixels (or sub-pixel locations) per unit time-step (e.g., per image frame), and thus may be directly subtracted from the column and row position (c, r). Each score is computed from a maximization over velocity-states of a prior time step. Thus, the term $S_{t-1,i+\Delta i,j+\Delta j}(c-v_i,r-v_j)$ refers to scores from a plurality of different velocity-state images of the time step t−1, which velocity-state images are determined by the set of considered velocity-state changes Δi, Δj. However, the current time's velocity-state ($v_i$, $v_j$) and position (c, r) constrains the prior position to a single considered location ($c-v_i$, $r-v_j$). It is to be understood that in embodiments wherein considered trajectories are defined by a prior velocity state or an interpolated velocity state, a different prior position would be computed for each such prior velocity state or interpolated velocity state.

The state-machine signal integrator 204 can employ the transition score $T_{\Delta i\Delta j}$ to penalize scores representative of velocity state changes Δi and Δj that are unlikely to be representative of objects of interest. In an example, the transition score $T_{\Delta i\Delta j}$ can be configured to penalize scores representative of non-zero velocity state changes. Such a penalty yields higher-scoring values for straighter paths, which tend to be better representative of realistic object trajectories. From the foregoing, it will be appreciated that the transition score can be configured to penalize (or reward) substantially any kind of velocity state change according to object motion behavior that is desirably detected. It is further to be understood that in various embodiments, the transition score Tay can simply be omitted from Eq. 1, and the state-machine signal integrator 204 can compute velocity-state images according to such modified Eq. 1.

In various embodiments, the state-machine signal integrator 204 is configured to consider sub-pixel-resolution positions and velocities of objects. Thus, in some embodiments, the state-machine signal integrator 204 can compute pixel values of the velocity-state images 214 according to:

$$S_{t,i,j}(c, r) = \max_{\substack{\Delta i\in\{-1,0,1\}\\ \Delta j\in\{-1,0,1\}}}(\Psi(N_t, c, r) + \Psi(S_{t-1,i+\Delta i,j+\Delta j}, c-v_i, r-v_j) + T_{\Delta i\Delta j}) \qquad \text{Eq. 2}$$

where Ψ(I, c, r) is a bilinear interpolation function applied to an image I at a real-valued position (c, r).

In some further embodiments, the state-machine signal integrator 204 is configured to apply non-linear scaling functions to pixel values of 1) difference images output by the background suppression component 202 and/or 2) pixel values of velocity-state images from a prior time step (e.g., $S_{t-1,i+\Delta i,j+\Delta j}(c-v_i,r-v_j)$) when computing pixel values for velocity-state images of a current time step. When combined with the interpolation function described above with respect to Eq. 2, an update equation used by the state-machine signal integrator 204 to compute pixel values of the velocity-state images 214 can be written as:

$$S_{t,i,j}(c, r) = \max_{\substack{\Delta i\in\{-1,0,1\}\\ \Delta j\in\{-1,0,1\}}}(\gamma_N(\Psi(N_t, c, r)) + \gamma_G(\Psi(S_{t-1,i+\Delta i,j+\Delta j}, c-v_i, r-v_j)) + T_{\Delta i\Delta j}) \qquad \text{Eq. 3}$$

where $\gamma_N(x)$ is a nonlinear scaling function applied to pixel values of difference images output by the background suppression component 202 and $\gamma_G(x)$ is a nonlinear scaling function applied to pixel values of prior-time velocity-state images. The functions $\gamma_N$ and $\gamma_G$ are configured to reduce the value of pixels with original values above certain thresholds. It has been observed that the probability that a pixel is representative of a real object does not increase substantially once a pixel is sufficiently bright (i.e., high-valued) to be reliably distinguishable from noise. However, when employed in linear signal integration, the bright pixels can cause visual artifacts that are not representative of true objects in a scene. The use of non-linear pixel value adjustment by way of the functions $\gamma_N$ and $\gamma_G$ in Eq. 3 does not substantially impede the detection of true objects depicted in a set of images, but mitigates the artifactual effects of very bright noise pixels in the images.

The functions $\gamma_N$ and $\gamma_G$ can be configured to reduce the values of pixels that initially exceed one or more threshold values. In exemplary embodiments, these functions $\gamma_N$ and $\gamma_G$ can be piecewise linear sigmoid functions. As an example, the function $\gamma_N$ can be configured to keep pixel values of difference images that are below a first threshold the same, to scale pixel values above the first threshold but below a second threshold according to a first scaling factor, and to scale pixel values above the second threshold according to a second scaling factor. The use of piecewise linear sigmoid functions as $\gamma_N$ and $\gamma_G$ can maintain the relative intensity ordering of pixel values, while reducing the absolute values of pixels with values over certain thresholds above which greater pixel values may be unlikely to be indicative of greater probability of a true object. It is to be understood that the thresholds described above can be experimentally determined based upon actual remote sensing imagery and known or expected ground truth (i.e., whether pixels are in fact representative of true objects in a depicted scene). In some embodiments, the scaling functions $\gamma_N$ and $\gamma_G$ can be smooth, non-decreasing functions whose second derivatives are never positive.

In various exemplary embodiments, a "forgetting factor," α, can be employed to reduce the effect of old data (e.g., prior-received remote sensing images 212) on scores assigned to velocity-state images. Use of the forgetting factor facilitates the use of streaming imagery (e.g., receipt of a stream of remote sensing images 212 by the object detection component 200 over time). The state-machine signal integrator 204 can compute pixel values of the velocity-state images 214 according to:

$$S_{t,i,j}(c,r) = \max_{\substack{\Delta i \in \{-1,0,1\} \\ \Delta j \in \{-1,0,1\}}} (\alpha \gamma_N(\Psi(N_t, c, r)) + (1-\alpha)\gamma_G(\Psi(S_{t-1,i+\Delta i,j+\Delta j}, c - v_i, r - v_j)) + T_{\Delta i \Delta j}) \quad \text{Eq. 4}$$

In exemplary embodiments, the forgetting factor, α, ranges from 0 to 1, inclusive. The greater the value of α, the less the velocity state of prior frames affects the score of a current frame. It is to be appreciated that responsive to an additional image of the scene being received by the object detection component 200, the state-machine signal integrator 204 can generate an additional set of velocity-state images 214 that are representative of states of objects in the scene depicted by the additional image at the time the additional image was received.

It is to be understood that the equations set forth above are exemplary and are not intended to be limiting. Other equations may be suitably employed by the state-machine signal integrator 204 in connection with computing scores for pixels of velocity-state images. It is further to be understood that the forgetting factor α, the functions $\gamma_N$ and $\gamma_G$, and the function Ψ can each be used independently of the others.

Furthermore, it is to be understood that in some embodiments, pixels of the velocity-state images 214 can be differently organized. For example, whereas in Eqs. 1-4 above, a velocity image $S_{t,i,j}$ is representative of a single velocity state (with horizontal and vertical components $v_i$, $v_j$) with pixels representing different positions in the scene, the velocity-state images 214 can instead be organized such that a single velocity-state image represents a single position in the scene (e.g., corresponding to a pixel location in the remote sensing images 212) with pixels representing different potential velocity states. Other possible organizations include embedding the pixels of many velocity-state images within one or more larger images. It is to be appreciated that there can be a one-to-one mapping between these different organizations of the velocity-state images 214, such that the number of pixels and their values is the same in either case.

From the foregoing, it is to be appreciated that pixel values of the velocity-state images 214 associated with the image 212 that depicts the scene at a first time depend on pixel values of velocity-state images associated with an image that depicts the scene at a second time prior to the first time. The scoring functions employed by the state-machine signal integrator 204 (e.g., Eqs. 1-4 above) are configured such that a pixel of a velocity-state image has a high value if it is likely that a real object with a velocity matching the velocity state of that velocity-state image is present in the image 212 at that same pixel location. Thus, as successive sets of velocity-state images are computed based upon successively-received images of a scene, signal energy accumulates at each pixel location according to a highest-scoring path through the sets of velocity-state images leading to that location.

Responsive to computing the velocity-state images 214 (e.g., according to any of Eqs. 1-4), the state-machine signal integrator 204 outputs the velocity-state images 214 to the state-machine background suppression (SMBS) component 206. As indicated above, the SMBS component 206 receives the velocity-state images 214 and outputs a corresponding set of velocity-state difference images 216. The SMBS component 206 is configured to suppress artifacts in the velocity-state images 214 that are likely to be due to signal integration of background clutter that is spatially persistent over time (e.g., resulting from objects such as coast lines, edges of buildings, boundaries of natural features like forests, etc.). While such background clutter is suppressed by the background suppression component 202, low-SNR remnants of such clutter can be integrated by the state-machine signal integrator 204. The SMBS component 206 mitigates artifacts in the velocity-state images 214 that are due to integration of low-SNR background clutter by the state-machine signal integrator 204.

The SMBS component 206 receives the velocity-state images 214. The SMBS component 206 applies one or more background suppression filters to the velocity-state images 214 to generate the velocity-state difference images 216. Such an approach tends to suppress background clutter without suppressing signal corresponding to all possible object trajectories near the clutter. Rather, the approach tends to suppress a limited range of trajectories that travel along brighter parts of the clutter over a long period of time. In exemplary embodiments, the SMBS component 206 applies an infinite impulse response (IIR) filter to each of the velocity-state images 214 to generate its corresponding velocity-state difference image in the velocity-state difference images 216. In some embodiments, the SMBS component 206 applies a different respective filter to each of the velocity-state images 214, rather than a common filter. In other embodiments, however, the SMBS component 206 can be configured to apply a same filter to each of the velocity-state images 214.

The SNR-enhanced image generator 208 receives the velocity-state difference images 216 and, based thereupon, generates an SNR-enhanced image 218 in which low-SNR moving objects are depicted with higher-SNR than in the original image 212 of the scene. The SNR-enhanced image generator 208 generates the SNR-enhanced image 218 by assigning to each pixel of the SNR-enhanced image 218 the highest score at a corresponding position to the pixel from among the velocity-state images 214 or the velocity-state difference images 216. In other words, the SNR-enhanced image generator 208 identifies locations within the velocity-state images 214/velocity-state difference images 216 that correspond to a same pixel in the SNR-enhanced image 218. The SNR-enhanced image generator 208 then assigns to that pixel in the SNR-enhanced image 218 the highest score from among the identified locations in the velocity-state images 214/velocity-state difference images 216. Thus, in an exemplary embodiment, the SNR-enhanced image generator 208 can assign pixel values of the SNR-enhanced image 218 according to:

$$E_t(c,r) = \max_{i,j,\Delta c,\Delta r} S_{i,j}(Mc + \Delta c, Mr + \Delta r) \quad \text{Eq. 5}$$

where E is the output SNR-enhanced image 218, i, j, c, r, and S are as defined above with respect to Eqs. 1-4, M is a sub-pixel multiplier between a resolution of the original image 212 and a position grid employed in the velocity-state images 214, and (Δc, Δr) range over possible offsets that still yield a grid position inside an original pixel (c, r) of the original image 212. In a non-limiting example, Δc, Δr can take values in [0,1,2] if M=3, indicating that the position grid of the velocity-state images 214 used a three-times finer spacing than the original image 212. In embodiments wherein the pixel spacing of the original image 212 is preserved in the position grid of the velocity-state images 214, adjustments M and Δc, Δr can be omitted from Eq. 5. It is to be understood that in Eq. 5, S can refer to either of velocity-state images 214 or velocity-state difference images 216, depending on whether the SMBS component 206 is used.

The SNR-enhanced image 218 can further include data indicative of, for each pixel of the SNR-enhanced image 218, an estimated velocity of an object present in the pixel. In various embodiments, these estimated velocities can be treated as a velocity image I' that is defined by:

$$V_t(c,r)=v_{argmax_{i,j}}\max_{\Delta c,\Delta r}S_{i,j}(Mc+\Delta c,Mr+\Delta r) \quad \text{Eq. 6}$$

where $v_{i,j}$ is the velocity of the i,jth state from among the velocity-state images 214. Again, it is to be understood that in Eq. 6, S can refer to either of velocity-state images 214 or velocity-state difference images 216.

The SNR-enhanced image generator 208 can output the SNR-enhanced image 218 to a system other than the object detection component 200 for analysis or other processing. In a non-limiting example, and referring again briefly to FIG. 1, the object detection component 120 can output an SNR-enhanced image (e.g., the image 218) to the display 118, on which the SNR-enhanced image is displayed as image frame 126. The image frame 126 can be reviewed by an analyst for the purpose of identifying objects in the image frame 126.

The SNR-enhanced image generator 208 can be configured to output the SNR-enhanced image 218 to the detector component 210. The detector component 210 is configured to receive the SNR-enhanced image 218 and to generate a set of detections 220 that identifies pixels that are determined by the detector component 210 to be likely to be representative of objects of interest in the scene depicted by the original image 212. The detector component 210 can generate the set of detections 220 in various ways. In an exemplary embodiment, the detector component 210 determines which pixels of the SNR-enhanced image 218 have values above a detection threshold, and outputs these pixels as the detections 220. In various embodiments, the detector component 210 can perform non-maximum suppression filtering, wherein a pixel that is above the detection threshold is only included in the set of detections 220 if the pixel has a higher value than all other pixels in a surrounding neighborhood of pixels (e.g., a square of pixels centered about the pixel).

Various modifications of the object detection component 200 are contemplated as being within the scope of the present disclosure. For instance, in some embodiments, either or both of the background suppression component 202 and the state-machine background suppression component 206 can be omitted, such that the state-machine signal integrator 204 receives the image 212 and the SNR-enhanced image generator 208 receives the velocity-state images 214 rather than the state-difference images 216.

Referring once again to FIG. 1, the object detection component 120 can be configured to output any or all of the velocity-state images or the SNR-enhanced images in the data store 119 as image data 127. Thus, the image data 127 can be representative of historical state information for candidate objects in a scene depicted by the remote sensing images 104.

The object detection component 120 can further be configured to output, for each of the sequence of images 104, a set of detections (e.g., as generated by a detector component such as the detector component 210) to the motion tracking component 122. In further embodiments, the object detection component 120 can be configured to output the set of detections to the data store 119 for storage as detection data 128. The motion tracking component 122 can identify a set of tracks that extend across the sequence of images 104 based upon the detections. In an exemplary embodiment, the motion tracking component 122 can identify a sequential string of detections in the set of detections across multiple images in the sequence of images 104 as belonging to a same track. The motion tracking component 122 can store a list of the identified detections in the data store 119 as track data 130.

In some embodiments, the motion tracking component 122 can be configured to perform further state-machine-based processing on the images 104 to refine previously-identified tracks. It may be computationally intensive for the objection detection component 120 to employ a dense velocity grid over a wide range of velocities over the entirety of large images. For example, a velocity range of ±5 pixels/frame in horizontal and vertical velocities with a velocity spacing of 0.05 pixels/frame would result in 40,000 possible velocities, each with its own corresponding velocity-state image. Continuing the example, if the images 104 have a size of 5,000×5,000 pixels, then corresponding sets of velocity-state images could require several terabytes of memory to store. In exemplary embodiments, the motion tracking component 122 is configured to facilitate signal integration within a limited region of interest within a larger image, allowing the use of a dense velocity grid over a wide range of velocities without excessive memory requirements. With greater particularity, the motion tracking component 122 can be configured to facilitate signal integration within a region of interest centered about a previously-identified object track.

Figure 4:
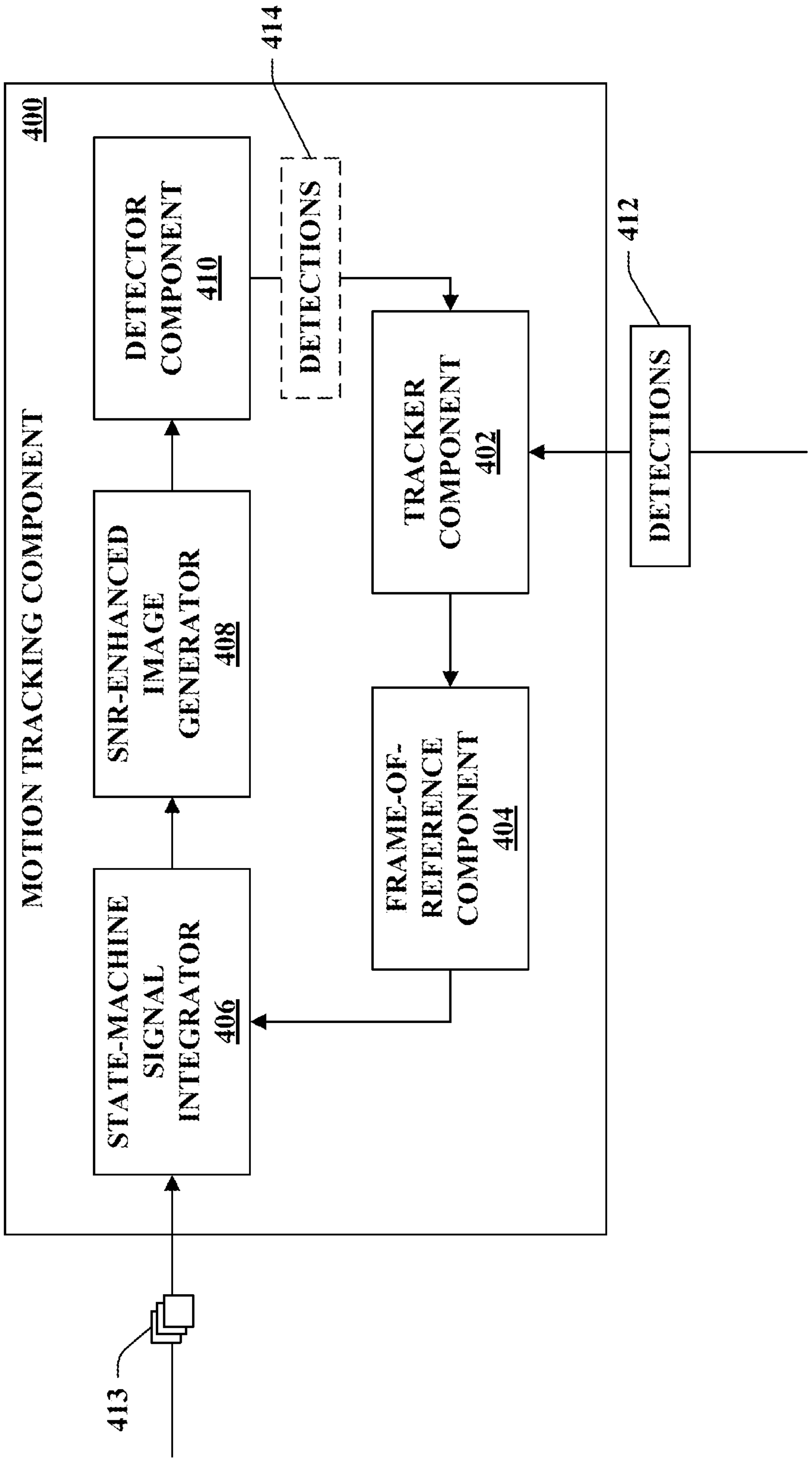
FIG. 4 is a functional block diagram of an exemplary motion tracking component.

With reference now to FIG. 4, an exemplary motion tracking component 400 is shown, wherein the motion tracking component 400 is configured to refine tracks initially identified by an object tracker. The motion tracking component 400 includes a tracker component 402, a frame-of-reference (FOR) component 404, a state-machine signal integrator 406, an SNR-enhanced image generator 408, and a detector component 410. The state-machine signal integrator 406, the SNR-enhanced image generator 408, and the detector component 410 function in similar manner to the state-machine signal integrator 204, the SNR-enhanced image generator 208, and the detector component 210, respectively, with various modifications described in greater detail below. It is to be understood that in some embodiments, a motion tracking component (e.g., the motion tracking component 122) can fail to include any or all of the FOR component 404, the state-machine signal integrator 406, the SNR-enhanced image generator 408, or the detector component 410. By way of example, and not limitation, a motion tracking component 122 can include solely the tracker component 402, which component 402 can output data to and receive data from the state-machine signal integrator 204, the SNR-enhanced image generator 208, and/or the detector component 210 of the object detection component 200.

The tracker component 402 can initially receive detections 412 that are output by an object detection component (e.g., the detections 220) and outputs one or more tracks based on the detections. The FOR component 404 receives a track from the tracker component 402. The track is indicative of an estimated current position of a target to which the track pertains, and an estimated current velocity of the target. The track can further indicate a predicted position of the target at a next time step, and a predicted velocity of the target at the next time step. When a next-in-time detection is received by the tracker component 402, the tracker component 402 updates the track with an updated estimated position of a target to which the track pertains, and an updated estimated velocity of the target (e.g., as indicated by velocity-state data included with an SNR-enhanced image generated by the SNR-enhanced image generator 208). The tracker component 402 provides the updated estimated position of the target and the updated estimated velocity of the target to the FOR component 404.

The FOR component 404 is configured to compute a shift to a position and/or velocity frame of reference for use in signal integration computations. The computed shift can be employed by a state-machine signal integrator (e.g., the state-machine signal integrator when computing velocity-state images centered about a track position). The shift to the frame(s) of reference can account for potential errors in the estimated position or velocity of a target to which a track pertains.

The FOR component 404 computes shifts for the position frame of reference and the velocity frame of reference based upon a difference between the predicted next position and velocity of the target indicated by the track before the update, and the estimated position and velocity of the target after the update provided by the tracker component 402. For example, the pre-update track can indicate a current estimated position at time to as x-y coordinates (100, 100) and a current estimated velocity at time to as horizontal and vertical velocity components (3,5). The pre-update track can further indicate a predicted position of the target at a future time $t_1$ as (103, 105.01) and a predicted velocity of the target at $t_1$ of (3, 5.02), based upon an estimated acceleration of (0, 0.02). Continuing the example, the post-update track can indicate a current estimated position at time $t_1$ (e.g., based upon detections pertaining to time $t_1$ derived from an SNR-enhanced image depicting the scene at $t_1$) of (104, 106) and a current estimated velocity at time $t_1$ of (3, 6). The difference between the predicted position at $t_1$ (based on detections prior to $t_1$) and the estimated position at $t_1$ (based on detections at time $t_1$), is (1, 0.99). The difference between the predicted velocity at $t_1$ and the estimated velocity at $t_1$ is (0, 0.98). In the example, the FOR component 404 computes the shift to the position frame of reference at the time $t_1$ as the difference between the predicted position at $t_1$ indicated in the pre-update track and the estimated position at $t_1$ indicated by the post-update track. Similarly, the FOR component 404 computes the shift to the velocity frame of reference at the time $t_1$ as the difference between the predicted velocity at $t_1$ and the estimated velocity at $t_1$. The FOR component 404 outputs the computed position frame of reference shift and/or the computed velocity frame of reference shift to the state-machine signal integrator 406.

The state-machine signal integrator 406 receives the frame of reference shifts from the FOR component 404. The state-machine signal integrator 406 is configured to compute velocity-state images for a region centered about a position on the track output by the tracker component 402. In connection with computing the velocity-state images, the state-machine signal integrator 406 can receive difference images 413 that are representative of a scene at different times including the time to which the frame-of-reference shifts correspond (e.g., from the object detection component 120). In exemplary embodiments, the state-machine signal integrator 406 computes the velocity-state images for a region of at least 99×99 pixels, at least 31×31 pixels, or at least 9×9 pixels centered about a most-recent estimated position of a target on the track. In general, the state-machine signal integrator 406 can recompute a set of velocity state images for a timestep t as:

$$S_{t,i,j}(c,r)=S_{t,i+\Delta i,j+\Delta j}(c+\Delta c,r+\Delta r) \qquad \text{Eq. 7}$$

where (Δc, Δr) is the position difference expressed as a number of pixels in the horizontal and vertical directions, respectively, and (Δi, Δj) is a velocity-grid index shift. Eq. 7 effectively shifts pixels and grid positions of velocity-state images initially computed as described above with respect to the state-machine signal integrator 204. The position difference (Δc, Δr) is a number of velocity-state image pixels. Thus, if there is not a one-to-one correspondence between velocity-state image pixels and pixels of the difference images 413, a conversion from difference image pixels to velocity-state image pixels may need to be performed (e.g., by multiplying by a number of velocity-state image pixels per difference image pixel). The velocity-grid index shift (Δi, Δj) is computed based upon the velocity difference ($\Delta v_c$, $\Delta v_r$) computed by the FOR component 404. The velocity-grid index shift represents a number of nodes in the velocity-state grid that, given the velocity spacing between adjacent nodes in a velocity-state grid, the velocity-state grid would need to be shifted in each of the horizontal and vertical directions to account for the velocity difference computed by the FOR component 404. For instance, if the change in velocity between adjacent nodes in a velocity-state grid is 0.1 pixels per frame, and the velocity difference computed by the FOR component 404 is (0, 0.2), the corresponding velocity-grid index shift would be (0, 2).

For various pixel locations along or near borders of velocity-state images, there may be no pixel values from which to shift a pixel value when accounting for a position frame-of-reference shift. For these pixels, the state-machine signal integrator 406 can take the post-shift values as being equal to zero, or some other constant value. Similarly, for various grid locations in the set of velocity-state images at or near edges of the velocity-state grid, there may be no velocity image available to shift into the grid location. For these grid locations, an entire velocity-state image can be set equal to zero or some other constant value.

The state-machine signal integrator 406 outputs velocity-state images for the constrained region centered about the track based upon the position and/or velocity frame-of-reference shifts (e.g., according to Eq. 7 above). By accounting for the frame-of-reference shifts, the state-machine signal integrator 406 reduces the likelihood that a true target will fail to be detected by the detector component 410 due to misalignment of signal energy in the velocity-state images resulting from potentially erroneous track predictions.

The SNR-enhanced image generator 408 receives the velocity-state images from the state-machine signal integrator 406, and based thereupon generates an SNR-enhanced image of the constrained region centered about the track. In exemplary embodiments, the SNR-enhanced image generator 408 sets pixel values of pixel locations of the SNR-enhanced image based upon values of pixels of the velocity-state images at a same corresponding location. In further embodiments, the SNR-enhanced image generator 408 can set the pixel value of each pixel location of the SNR-enhanced image equal to the highest valued pixel at the corresponding pixel location from among the velocity-state images generated by the state-machine signal integrator 406.

The SNR-enhanced image generator 408 can output the SNR-enhanced image for presentment on a display (e.g., as the image frame 126 on the display 118). The SNR-enhanced image generator 408 can also or otherwise be configured to output the SNR-enhanced image to the detector component 410, whereupon the detector component 410 outputs track-specific detections 414 that can be received and employed by the tracker component 402 to update the track. As additional difference images 413 are received by the motion tracking component 400, the motion tracking component 400 can output an updated track and/or additional SNR-enhanced images of a constrained region centered about a most-recent position of the target to which the track corresponds. These SNR-enhanced images can include velocity-state data for the target. Since the motion tracking component 400 is configured for track-specific motion tracking, these velocity-state data can have a finer resolution than velocity-state data for the target computed in connection with generating an SNR-enhanced image of the entire scene to which a remote sensing image pertains (e.g., as described above with respect to the object detection component 200).

Figure 5:
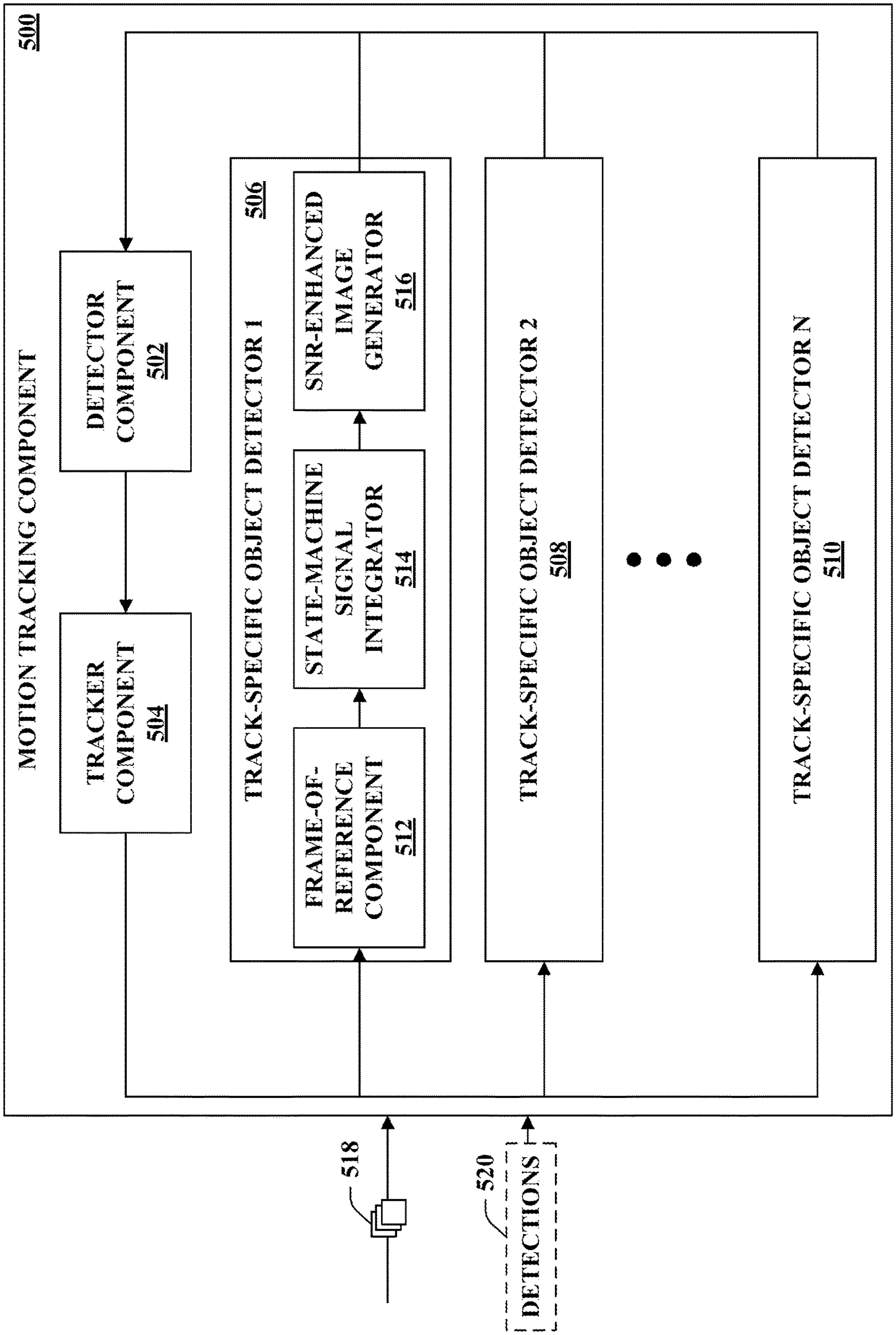
FIG. 5 is a functional block diagram of another exemplary motion tracking component.

In various embodiments, the motion tracking component 122 can be configured to maintain a state-machine signal integration pipeline for each track identified in the images 104. By way of example, and with reference now to FIG. 5, another exemplary motion tracking component 500 is illustrated. The motion tracking component 500 includes a detector component 502 and a tracker component 504 that function in a similar manner to the detector component 410 and the tracker component 402, respectively. The motion tracking component 500 further includes a plurality of N track-specific object detectors 506-510, where N is a nonzero integer. The track-specific object detectors 506-510 are configured to perform track-specific object detection in a similar manner as described above with respect to the motion tracking component 400. For example, the first track-specific object detector 506 includes a FOR component 512, a state-machine signal integrator 514, and an SNR-enhanced image generator 516.

In an exemplary embodiment, the motion tracking component 500 receives an initial set of remote sensing images of a scene (e.g., difference images) and an initial set of detections 520 that pertain to the images 518. For example, the detections 520 can be detections generated by the object detection component 200 as described above with respect to FIG. 2. Based upon the detections 520, the tracker component 504 can identify, in the scene, a track that comprises a plurality of locations that are likely to be representative of positions of a same object in the scene over time. The tracker component 504 provides the track to the first track-specific object detector 506.

In some embodiments, the track-specific object detectors 506-510 can include their own track-specific tracker components, which tracker components receive detections from the detector component 502 and output tracks to their respective FOR components (e.g., FOR component 512). In such embodiments, the tracker component 504 can instead be configured to generate tracks across a whole of the images 518, rather than within a track-specific constrained region. It is to be understood that a tracker component 504 can independently generate and maintain state information for a plurality of tracks within an image.

The FOR component 512 computes at least one of a position frame-of-reference shift or a velocity frame-of-reference shift based upon the track (e.g., based upon a difference between a predicted and estimated latest position indicated by the track). The state-machine signal integrator 514 can, based upon the images 518 and the position frame-of-reference shift and/or the velocity frame-of-reference shift, generate a set of velocity-state images that depict a constrained region centered about a most-recent estimated location along the track, which location is estimated by the tracker component 504. Based upon the velocity-state images, the SNR-enhanced image generator 516 generates an SNR-enhanced image of the constrained region. The SNR-enhanced image generator 516 can output the SNR-enhanced image to the detector component 502. The detector component 502 can output one or more detections to the tracker component 504 based upon the SNR-enhanced image. The tracker component 504 can then output an update to the track to the FOR component 512.

The tracker component 504 can identify a plurality of tracks in the initial set of detections 520. The tracker component 504 provides a different respective track (and different respective updates pertaining to such tracks) to each of the track-specific object detectors 506-510. Thus, each of the track-specific object detectors 506-510 can output its own SNR-enhanced images of a different respective constrained region within the larger images 518. It is to be appreciated, therefore, that as additional remote sensing images 518 are received by the motion tracking component 500, the track-specific object detectors 506-510 can generate updated SNR-enhanced images of constrained regions about their respective tracks. In some embodiments, the motion tracking component 500 is configured to initiate an additional track-specific object detector (e.g., an additional software instance of a track-specific object detector) in response to a new track being identified in the images 518 by the tracker component 504 as additional images 518 are received by the motion tracking component 500.

Figure 6:
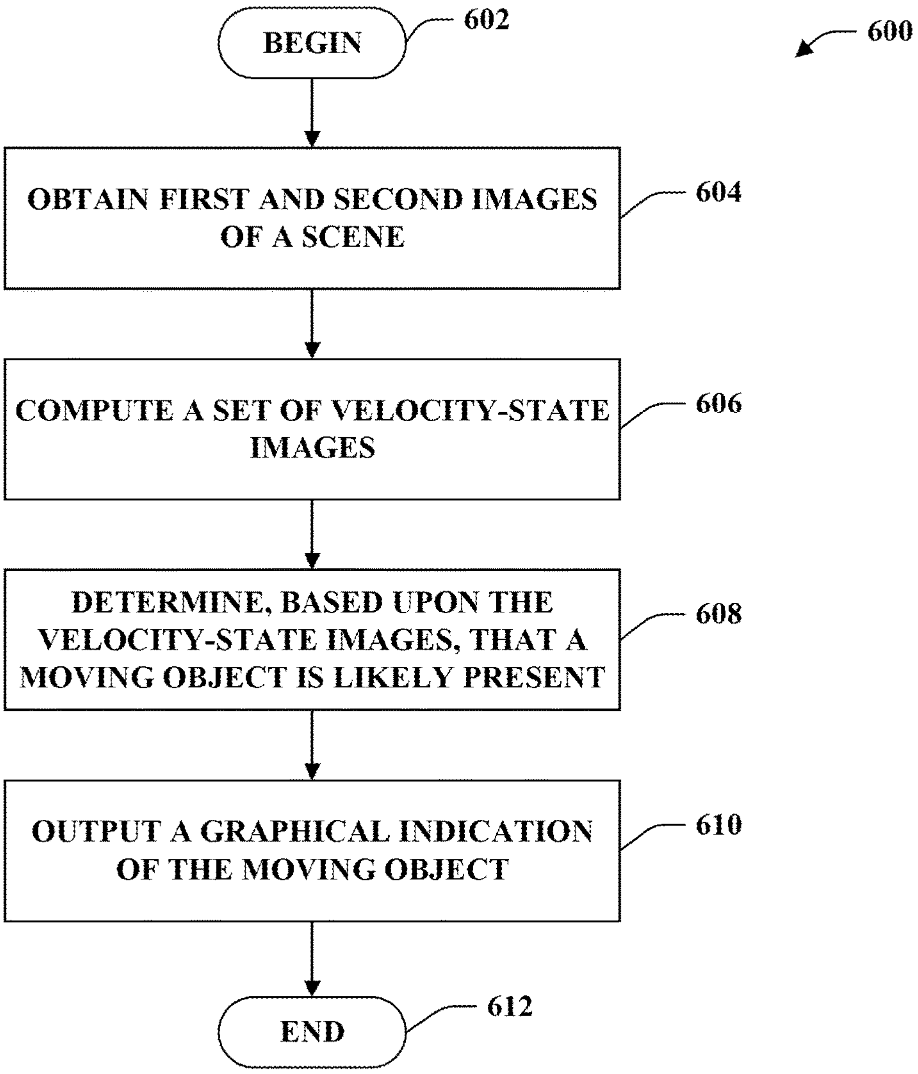
FIG. 6 is a flow diagram that illustrates an exemplary methodology for detection of low-SNR moving objects in remote sensing imagery.

FIG. 6 illustrates an exemplary methodology relating to detection of low-SNR moving objects in remote sensing imagery. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 6, a methodology 600 that facilitates detecting a low-SNR moving object in remote sensing imagery is illustrated. The methodology 600 begins at 602, and at 604, first and second images of a scene are obtained. The first image of the scene is representative of the scene at a first time. The second image of the scene is representative of the scene at a second time. At 606, a set of velocity-state images that represents possible positions and velocities of objects in the scene at the second time is computed based upon the first image of the scene and the second image of the scene.

In an exemplary embodiment, the set of velocity state images can be computed based upon a prior set of velocity-state images that is representative of possible positions and velocities of objects in the scene at the first time. The prior set of velocity-state images can be a set of velocity-state images previously computed in connection with determining the likely presence of moving objects in the scene at the first time depicted by the first image. Thus, for example, pixel values of the set of velocity-state images can be computed based upon pixel values of the prior set of velocity-state images and pixel values of the second image that depicts the scene at the second time. In a non-limiting example, pixel values of the set of velocity-state images can be computed according to any of Eqs. 1-4.

At 608, a determination is made, based upon the set of velocity-state images computed at 606, that a moving object is likely present in the scene at the second time. For example, it can be determined that a moving object is likely present in the scene at a first location based upon values of pixels of the velocity-state images that are representative of the first location in the scene. In non-limiting embodiments, a maximum value of pixels of the velocity-state images that correspond to the first location in the scene is determined. The determined maximum value is compared against a detection threshold. If the determined maximum value exceeds the threshold, it can be determined that a moving object is likely present at the first location in the scene at the second time.

At 610, a graphical indication of the moving object is output to a display. The graphical indication can be any or several of an image of the scene that includes a graphical indicia of the moving object, a track of positions of the moving object over time that includes the first location, or one or more of the velocity-state images. At 612, the methodology 600 ends.

Figure 7:
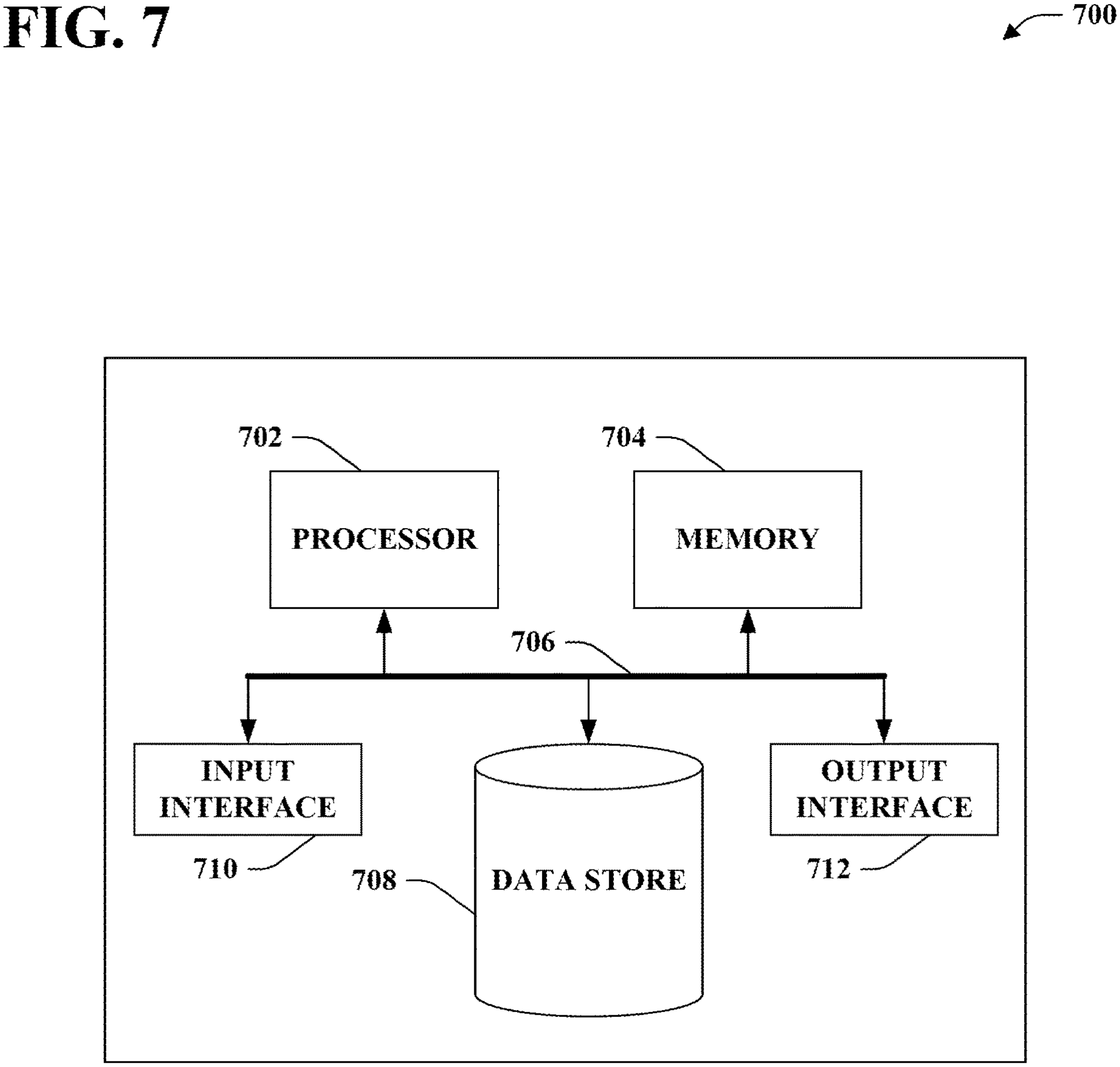
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be used in a system that generates remote sensing images (e.g., the computing device 110) or receives and processes remote sensing images (e.g., the computing device 106). The computing device 700 includes at least one processor 702 that executes instructions that are stored in a memory 704. The instructions may be, for instance, instructions for implementing functionality described as being carried out by one or more components discussed above or instructions for implementing one or more of the methods described above. As will be appreciated by those of skill in the art, the processor 702 may include multiple cores. Further, such multiple cores may have their own corresponding local registers and caches, and/or shared registers and caches. The processor 702 may access the memory 704 by way of a system bus 706. In addition to storing executable instructions, the memory 704 may also store remote sensing images, velocity-state images, position/velocity/acceleration state data, object detection and tracking data, etc.

The computing device 700 additionally includes a data store 708 that is accessible by the processor 702 by way of the system bus 706. The data store 708 may include executable instructions, remote sensing images, velocity-state images, position/velocity/acceleration state data, object detection and tracking data, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc., by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:

at least one of a processor or a hardware logic component configured to perform acts comprising:

obtaining a sequence of images each depicting a scene at a different respective time;

computing, based upon the sequence of images, a first set of velocity-state images, wherein the set of velocity-state images corresponds to a first time, wherein pixels of the velocity-state images collectively represent position and velocity states that objects in the scene may take, wherein pixel values of the pixels are indicative of the presence of objects at locations in the scene at the first time;

obtaining a second set of velocity-state images, wherein the second set of velocity-state images corresponds to a second time prior to the first time and wherein the pixel values of the first set of velocity-state images are based upon the second set of velocity-state images and a first image in the sequence of images that depicts the scene at the first time determining, based upon the set of velocity-state images, that an object is likely present at a first location in the scene at the first time; and outputting an indication of the presence of the object at the first location in the scene at the first time to a device comprising one of hardware or software or a combination thereof, wherein the first set of velocity-state images comprises a first velocity-state image, the first velocity-state image including a first pixel that is representative of the first location in the scene and that has a first pixel value, the first image in the sequence of images including a second pixel that is representative of the first location in the scene and that has a second pixel value, wherein the first pixel value is based upon the second pixel value.

2. The system of claim 1, further comprising:

a memory that is operably coupled to the processor and that stores instructions that, when executed by the processor, cause the processor to perform the acts.

3. The system of claim 1, wherein obtaining the sequence of images comprises:

receiving a remote sensing image that is representative of the scene at the first time; and generating a second image by executing, over the remote sensing image, an algorithm configured to increase a difference between pixel values of first pixels that are representative of objects and pixel values of second pixels that are representative of background clutter.

4. The system of claim 1, wherein the first set of velocity-state images comprises a first velocity-state image, the first velocity-state image including a first pixel that is representative of a first position and that has a first pixel value, wherein the second set of velocity-state images comprises a second velocity-state image that includes a third pixel that is representative of a second position and that has a second pixel value, wherein the first pixel value is based upon the second pixel value, and wherein the second position is a position at which an object present at the second time could transition into the first position at the first time if the object present at the second time were traveling according to a state machine model of possible positions, velocities, and allowed acceleration transitions.

5. The system of claim 4, wherein the first pixel is associated with a first velocity and the third pixel is associated with a second velocity, wherein the second velocity is a velocity at which an object present at the second time could transition to the first velocity at the first time if it were traveling according to the state machine model of possible positions, velocities, and allowed acceleration transitions.

6. The system of claim 1, wherein determining that the object is present at the first location in the scene at the first time comprises:

executing a background suppression algorithm over each of the velocity-state images to generate a plurality of velocity-state difference images; and determining, based upon the velocity-state difference images, that the object is likely present at the first location in the scene at the first time.

7. The system of claim 1, the acts further comprising:

identifying a track of the object that indicates estimated positions of the object over time, the estimated positions including the first location in the scene, wherein the indication of the presence of the object includes an indication of the track.

8. The system of claim 1, the acts further comprising:

identifying a track of the object that indicates estimated positions of the object over time, the estimated positions including the first location in the scene;

computing a track-specific set of velocity-state images that represent a constrained region about the estimated positions of the object over time; and outputting an indication of a location of the object within the constrained region based upon the track-specific set of velocity-state images.

9. A system comprising:

at least one of a processor or a hardware logic component configured to perform acts comprising:

obtaining a sequence of images each depicting a scene at a different respective time;

computing, based upon the sequence of images, a set of velocity-state images, wherein the set of velocity-state images corresponds to a first time, wherein pixels of the velocity-state images collectively represent position and velocity states that objects in the scene may take, wherein pixel values of the pixels are indicative of the presence of objects at locations in the scene at the first time;

identifying a track of the object that indicates estimated positions of the object over time and a predicted position of the object at a future time;

receiving an update to the track indicating that the object is estimated to be at a first estimated position at the future time;

computing at least one of a position frame-of-reference (FOR) shift or a velocity FOR shift based upon a difference between the first estimated position and the predicted position; and computing a track-specific set of velocity-state images within a constrained region centered about the track based upon the at least one of the position FOR shift or the velocity FOR shift;

determining, based upon the set of velocity-state images, that an object is likely present at a first location in the scene at the first time; and outputting an indication of the presence of the object at the first location in the scene at the first time to a device comprising one of hardware or software or a combination thereof.

10. The system of claim 1, the acts further comprising:

scaling pixels of a first image in the sequence of images according to a scaling function, wherein the scaling function is configured to reduce a pixel value of a first pixel in the first image based upon the pixel value.

11. The system of claim 1, wherein the set of velocity-state images is a second set of velocity-state images, wherein computing the second set of velocity-state images comprises:

computing, based upon the sequence of images, a first set of velocity-state images corresponding to the first time; and generating the second set of velocity-state images by scaling pixels of the first set of velocity-state images according to a scaling function that is configured to reduce a pixel value of a first pixel of the first set of velocity-state images based upon the pixel value.

12. The system of claim 1, wherein determining, based upon the set of velocity-state images, that the object is likely present at the first location in the scene at the first time comprises:

generating a signal-to-noise-ratio (SNR)-enhanced image based on the velocity-state images, wherein a pixel value of a first pixel of the SNR-enhanced image that represents the first location is based upon pixels in the velocity-state images that correspond to the same first location; and determining that the object is likely present at the first location in the scene based upon the pixel value of the first pixel of the SNR-enhanced image.

13. A method comprising:

receiving a plurality of images that each depict a scene at a different respective time;

generating, from the received images, a set of velocity-state images, wherein pixels of the velocity-state images collectively represent position and velocity states that objects in the scene may take, wherein pixel values of the pixels of the velocity-state images are indicative of the presence of objects at locations in the scene at a first time;

determining, based upon the set of velocity-state images, that an object is likely present at a first location in the scene at the first time; and outputting an indication of the presence of the object at the first location in the scene at the first time to a device comprising one of hardware or software or a combination thereof; and wherein the plurality of images are received as a stream of images over time and responsive to receiving an additional image in the stream of images, generating an additional set of velocity-state images, wherein the additional set of velocity-state images is generated based upon a prior set of velocity-state images, the prior set of velocity-state images generated in response to receipt of a prior image that precedes the additional image in the stream of images.

14. The method of claim 13, wherein pixel values of the additional set of velocity-state images are based upon pixel values of the prior set of velocity-state images and pixel values of the additional image.

15. The method of claim 13, wherein pixel values of the additional set of velocity-state images are based upon pixel values of a plurality of sets of velocity-state images, each of the plurality of sets of velocity-state images generated in response to receipt of a respective image in the stream of images.

16. The method of claim 15, wherein further the pixel values of the additional set of velocity-state images are based upon a forgetting factor.

* * * * *